March 29, 1927.  1,622,350
J. C. SABEL
BINOCULAR MICROSCOPE
Filed June 8, 1926    2 Sheets-Sheet 1

INVENTOR
John C. Sabel
BY
his ATTORNEYS

March 29, 1927. 1,622,350
J. C. SABEL
BINOCULAR MICROSCOPE
Filed June 8, 1926 2 Sheets-Sheet 2
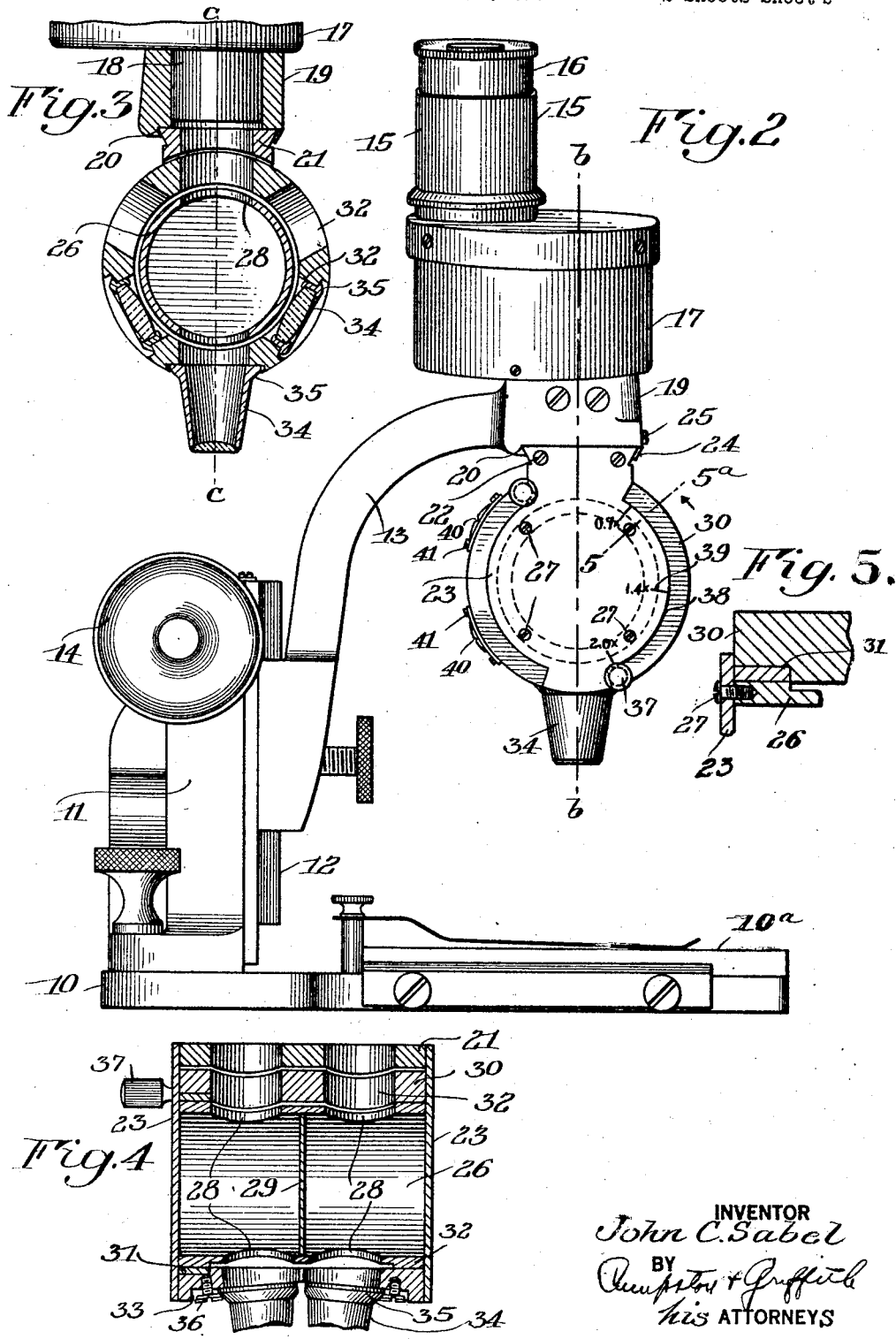
INVENTOR
John C. Sabel
BY
his ATTORNEYS Patented Mar. 29, 1927.

1,622,350

UNITED STATES PATENT OFFICE.

JOHN C. SABEL, OF ROCHESTER, NEW YORK, ASSIGNOR TO BAUSCH & LOMB OPTICAL COMPANY, OF ROCHESTER, NEW YORK, A CORPORATION OF NEW YORK.

BINOCULAR MICROSCOPE.

Application filed June 8, 1926. Serial No. 114,529.

This invention relates to microscopes and more particularly to the binocular variety thereof, one object of the invention being to provide an improved instrument of this description comprising a simple, practical and convenient means for varying the power thereof. Another object is to provide an instrument of this character having a plurality of sets of twin objectives of varying power, together with convenient means for quickly selecting and positioning a desired set of objectives at the ends of the lens tubes in alignment with the optical axes. A further object is to provide such an instrument having an adjustable carrier for the objectives rotatable about an axis substantially perpendicular to the median line between the lens tubes and provided with efficient means for detachably securing and centering the objectives individually on the carrier. Still a further object is to provide an instrument of the above nature having a compact form of construction convenient in use and capable of being economically manufactured.

To these and other ends the invention resides in certain improvements and combinations of parts, all as will be hereinafter more fully described, the novel features being pointed out in the claims at the end of the specification.

In the drawings:—

Figure 2 is a side elevation of the same;

Figure 3 is a sectional detailed view substantially on the line c—c in Figure 1;

Figure 4 is a sectional detailed view substantially on the line b—b in Figure 2;

Figure 5 is an enlarged sectional detail on the line 5ª—5ª in Figure 2;

Similar reference numerals throughout the several views indicate the same parts.

Figure 1:
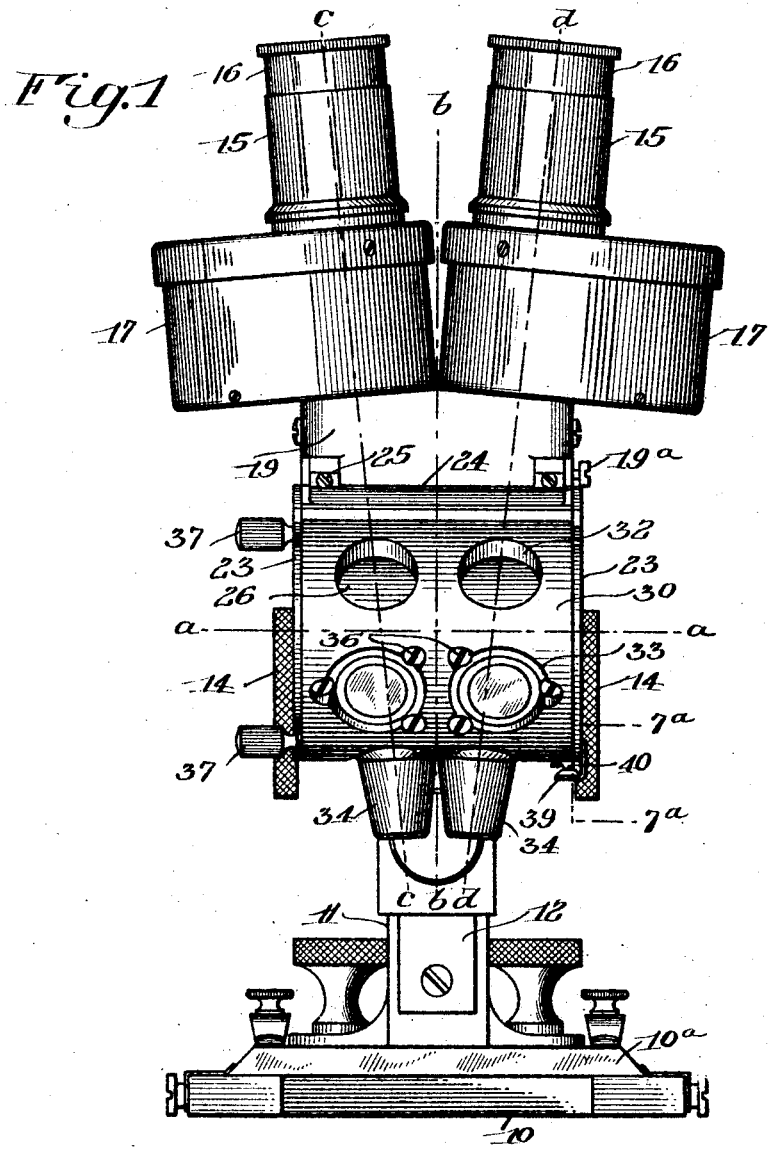
Figure 1 is a front elevation of an instrument embodying the present invention.
Figure 6:
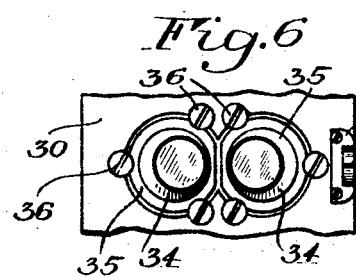
Figure 6 is an enlarged detailed view showing the means for securing and centering the objective lens mounts on the carrier.
Figure 7:
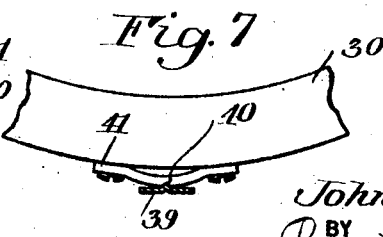
Figure 7 is an enlarged detailed view partly in section substantially on the line 7ª—7ª of Figure 1.

The invention is disclosed in the present instance, by way of illustration, as embodied in conjunction with a binocular microscope comprising a base 10, having a stage 10ª and carrying a pillar 11 provided with ways 12 on which slides a vertically adjustable arm 13 for supporting the lens tubes. At 14 are the usual rotary knobs for a rack and pinion mechanism (not shown) for producing the vertical adjustment of arm 13. These parts may be of any usual or suitable character and since their particular construction forms no part of the present invention, a further description thereof is unnecessary.

The binocular optical system is in the present instance of the variety comprising twin lens tubes 15 converging downwardly at a suitable angle. The ocular portions 16 are carried on prism boxes 17 having depending tubular portions 18 (Figure 3) rotatably mounted in corresponding bores in a head 19 carried by the arm 13. The oculars 16 as well as the tubular portions 18 are eccentric to the prism boxes 17 which latter contain any common or suitable erecting prism systems, as well understood in the art and as described, for example, in the Letters Patent to Patterson et al., No. 1,225,167 granted May 8, 1917, for binocular microscopes. It will be understood that the oculars and prism boxes are rotatable in their bearings in the head 19 and that by reason of the eccentricity of the parts, such rotary or pivotal adjustment serves to adjust the distance between the eyepieces of the oculars 16 to the desired interpupillary distance. The optical axes of course extend through the converging oculars 16, the erecting prism systems and the converging tubes 18 of the prism boxes and the corresponding converging bores which extend through the bottom of the head 19.

The variable objectives for the above described lens tubes are preferably mounted on an adjustable carrier rotatably supported on the arm 13, or, more specificially, on the head 19 thereof, adjacent the ends of the lens tubes. The carrier in the present instance also is in the form of a hollow cylindrical drum provided with circumferential spaced openings and seats on which the objectives are mounted. To this end the lower face of head 19 is formed with dovetail ways 20 (Figures 2 and 3) in which slides the correspondingly shaped detachable block 21 to the ends of which are secured as by means of screws 22 spaced depending supports or plates 23. Preferably the forward dovetail way is provided by a plate or gib 24 adjustably secured as by means of screws 25 on head 19, to adjust the fit of the head 20 and take up wear. A screw 19$^a$ limits the movement of said block as it is inserted in the ways, to properly position the same.

Carried between the spaced supports 23 is an axle for the objective carrier or drum in the form of a hollow cylindrical member 26, the ends of which are secured as by means of screws 27 to the supports 23 (Figure 5). The member or axle 26 has its walls cut away to provide openings 28 in alignment with the optical axes C—C and D—D of the lens tubes and the optical axes are preferably separated by a central transverse partition 29 (Figure 4) to avoid interference.

The objective carrier 30 is preferably constructed as a hollow cylindrical drum which is rotatably supported on the axle 26 between the supporting plates 23, as shown. At 31 is a bearing ring for the carrier, the other end of which bears on a shoulder on the axle. The carrier drum has its walls formed as shown with circumferentially spaced sets or pairs of openings 32, certain of which are provided on the outer surface of the drum with seats for receiving the objective lens mounts. There are six such sets of drum openings in the present instance, three of which are provided with objective elements, while the other three sets of openings, located respectively opposite the objective lenses, serve to avoid interference with the transmission of light along the optical axes. The openings 32 carrying the objectives preferably have their outer ends countersunk as at 33 with relatively inclined surfaces 34 in each set or pair for mounting the objectives in the proper converging relation to correspond with the converging optical axes.

The objectives themselves may take various forms, being shown in the present instance as simple lenses supported in mounts, as at 34, which are formed with edges beveled as at 35. The drum seats carry screws 36 (Figures 1 and 4) having beveled or tapered heads cooperating with the beveled edges of the objective lens mounts, so that by turning the screws home, more or less, the objectives are not only supported, but also adjustably centered relative to the optical axes.

For adjusting the carrier to bring any desired pair or set of twin objectives into position selectively for use in the optical axes, the carrier is equipped with one or more finger pieces or knobs 37 projecting from one of its ends. The adjacent support or plate 23 is cut away as at 38 to afford a clearance for the knobs 37 and the plate 23 is preferably marked as at 39 with suitable indicia to indicate the power of the objective in position for use, the indicia for each objective being marked on the plate opposite the position of one of the knobs 37 when the corresponding objective is in line with the optical axes.

For accentuating the different positions of the carrier and yieldably retaining the same therein there is provided a detent means comprising a leaf spring 39 mounted one one of the plates 23 and projecting angularly over the adjacent end of the carrier drum. The spring has a projecting portion adapted to yieldably engage in recesses 40 in clips 41, one of which is provided opposite each pair of objectives to indicate when the latter are in properly adjusted position for use and to retain the same therein.

It is apparent from the above description that the objective carrier may be quickly rotated by its knobs 37 about the axis $a$—$a$ thereof and of its axle. This axis lies in the plane of the optical axes of the lens tubes and perpendicular to the median line $b$—$b$ between the optical axes which median in the present instance is the bisector of the angle included between the converging optical axes $c$—$c$ and $b$—$b$. Such rotation of the carrier serves to bring the pairs or sets of twin objectives selectively into position for use in the optical axes and when a pair of objectives is so located, the diametrically opposite openings of the carrier are also in the optical axes so that the latter are unobstructed. If desired, of course, other forms of objectives may obviously be employed, each of which comprises cooperating lenses mounted respectively in diametrically opposite openings of the carrier. Thus by locating the forward knob opposite the marking on plate 23 of the desired power, the corresponding objectives are quickly and conveniently brought to position of use so that the invention affords a binocular microscope of simple and compact form with convenient means for quickly locating objectives of different powers for use in the optical system, the construction being furthermore of a practical nature capable of being inexpensively manufactured.

I claim as my invention:

1. A binocular microscope comprising a plurality of pairs of objectives, and a carrier for said objectives arranged for rotation about an axis lying substantially in the plane of the binocular axes at equal angles with the latter, for adjustably positioning each of said pairs of objectives, selectively, for use in the binocular axes.

2. A binocular microscope comprising a plurality of sets of twin objectives for the binocular axes, and a carrier for said objectives arranged for rotation about an axis substantially perpendicular to the median line between said binocular axes, for selectively positioning said sets of objectives for use in said binocular axes.

3. A binocular microscope having converging optical axes, a plurality of sets of twin objectives for said optical axes, and a carrier for said objectives arranged for rotation about an axis substantially perpendicular to the bisector of the angle included between said optical axes for selectively positioning said sets of objectives for use in said optical axes.

4. A binocular microscope comprising converging optical axes, a carrier adjustably rotatable about an axis substantially perpendicular to the bisector of the angle included between said optical axes, a plurality of sets of twin objectives for said optical axes spaced circumferentially on said carrier and adapted to be brought by the rotation of the latter selectively to position in said optical axes, and means for detachably supporting and centering said objectives on said carrier.

5. A binocular microscope comprising converging optical axes, a carrier adjustably rotatable about an axis substantially perpendicular to the bisector of the angle included between said optical axes, a plurality of sets of twin objectives for said optical axes spaced circumferentially about said carrier, bevelled mounts for said objectives, and screws on said carrier having bevelled heads cooperating with the bevelled portions of said objective mounts for securing and optically centering the same on the carrier.

6. A binocular microscope comprising an arm for supporting the lens tubes, an axle carried by said arm adjacent the ends of said tubes and having sight openings therethrough in line with the optical axes, a hollow cylindrical carrier rotating on said axle, and a plurality of sets of twin objectives mounted in circumferentially spaced relation on the wall of said carrier and adapted to be brought by the rotation of the latter selectively to position for use in said optical axes.

7. A binocular microscope comprising an arm for supporting the lens tubes, an axle carried by said arm below the ends of said tubes and cut away in the line of the optical axes, a hollow cylindrical drum rotating on said axle and provided with circumferentially faced lens mount seats, a plurality of sets of twin objectives, each of said objectives having an independent mount with bevelled edges, and bevelled means for detachably securing and centering said objective mounts on said drum seats.

8. A binocular microscope having converging optical axes, a plurality of pairs of objectives for said optical axes, and a carrier rotatable about an axis perpendicular to the bisector of the angle included between said optical axes and provided with a plurality of pairs of lens mount seats for said objectives, spaced circumferentially about said carrier with the seats of each pair arranged and inclined for supporting said objectives for use selectively in said optical axes.

9. A binocular microscope comprising an arm for supporting the lens tubes, spaced supports depending from said arm, a carrier rotatably mounted on said supports for rotation about an axis substantially perpendicular to the median line between said lens tubes, and a plurality of sets of twin objectives spaced circumferentially on said carrier and adapted to be brought by the rotation thereof selectively to position for use in alignment with said lens tubes.

10. A binocular microscope comprising an arm for supporting the lens tubes, spaced supports on said arm, an axle carried between said supports and cut away along the optical axes of said lens tubes, a hollow cylindrical carrier rotatably mounted on said axis, and a plurality of sets of twin objectives spaced circumferentially on said carrier and adapted to be brought by the rotation thereof selectively to position for use in said optical axes.

11. A binocular microscope comprising converging lens tubes, an arm for supporting said tubes, spaced supports depending from said arm, an axle on said supports perpendicular to the bisector of the angle included between said lens tubes, a carrier rotatable on said axle, and a plurality of sets of twin objectives spaced circumferentially on the carrier and adapted to be brought by the rotation thereof selectively to position for use in alignment with said lens tubes.

12. A binocular microscope comprising lens tubes, an arm for supporting said tubes, supporting means on said arm, an axle on said supporting means perpendicular to the median line between said lens tubes, a hollow drum rotating on said axle, a plurality of sets of twin objectives spaced circumferentially on said drum and adapted to be brought by the rotation thereof selectively to position for use in alignment with said lens tubes, means for detachably securing and centering said objectives individually on said drum and detent means for yieldably holding said drum with a selected set of objectives in position for use.

13. A binocular microscope comprising converging lens tubes, an arm for supporting said tubes, supporting means on said arm, an axle on said supporting means perpendicular to the bisector of the angle included between said lens tubes, a hollow drum rotatably supported on said axle adjacent the ends of the lens tubes and provided with circumferentially spaced pairs of seats with the seats of each pair inclined to correspond with the convergence of said lens tubes, a plurality of pairs of objectives on said seats having mounts with tapered portions, means on said drum for cooperation with said tapered portions of said objective mounts for detachably securing and centering the same individually on said drum and detent means for retaining said drum in adjusted position with a selected pair of said objectives in alignment with said lens tubes.

JOHN C. SABEL.